(12) United States Patent
Ebina

(10) Patent No.: US 10,001,777 B2
(45) Date of Patent: Jun. 19, 2018

(54) INFORMATION PRESENTING APPARATUS AND INFORMATION PRESENTING METHOD

(71) Applicant: Nissan Motor Co., Ltd., Yokohama-Shi, Kanagawa (JP)

(72) Inventor: Akihiko Ebina, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days. days.

(21) Appl. No.: 15/305,592

(22) PCT Filed: Apr. 25, 2014

(86) PCT No.: PCT/JP2014/061732
§ 371 (c)(1),
(2) Date: Oct. 20, 2016

(87) PCT Pub. No.: WO2015/162784
PCT Pub. Date: Oct. 29, 2015

(65) Prior Publication Data
US 2017/0038774 A1 Feb. 9, 2017

(51) Int. Cl.
*G05D 1/00* (2006.01)
*G05D 1/02* (2006.01)
(Continued)

(52) U.S. Cl.
CPC .......... *G05D 1/0061* (2013.01); *B60R 16/02* (2013.01); *B60W 40/08* (2013.01);
(Continued)

(58) Field of Classification Search
CPC . G05D 1/0061; G05D 1/021; B60W 50/0097; B60W 40/08; B60W 50/14;
(Continued)

(56) References Cited

U.S. PATENT DOCUMENTS 8,509,982 B2 * 8/2013 Montemerlo ........ G05D 1/0055
701/26
8,537,000 B2 * 9/2013 Nakagoshi ............... A61B 5/18
340/425.5

(Continued)

FOREIGN PATENT DOCUMENTS

EP 2314489 A1 4/2011
JP 2007010441 A 1/2007
(Continued)

OTHER PUBLICATIONS

Machine translation of JP 2007-010441 retrieved from Espacenet.com on May 30, 2017.*

*Primary Examiner* — Thomas Ingram
(74) *Attorney, Agent, or Firm* — Young Basile Hanlon & MacFarlane, P.C.

(57) ABSTRACT

An information presenting apparatus includes a system confidence level calculator configured to calculate a system confidence level of autonomous driving control, an information presenter configured to present, to a driver, information on allowableness of an action other than driving, and an information presentation controller configured to control switching of a content of the information presented on the information presenter according to the system confidence level calculated by the system confidence level calculator.

12 Claims, 10 Drawing Sheets

(51) Int. Cl.
  *B60W 50/14*   (2012.01)
  *B60R 16/02*   (2006.01)
  *G01C 21/26*   (2006.01)
  *G08G 1/16*    (2006.01)
  *B60W 40/08*   (2012.01)
  *B60W 50/00*   (2006.01)

(52) U.S. Cl.
  CPC ........ *B60W 50/0097* (2013.01); *B60W 50/14* (2013.01); *G01C 21/26* (2013.01); *G05D 1/021* (2013.01); *G08G 1/16* (2013.01); *B60W 2040/0818* (2013.01); *B60W 2050/146* (2013.01)

(58) Field of Classification Search
  CPC .... B60W 2040/0818; B60W 2050/146; B60R 16/02; G08G 1/16
  See application file for complete search history.

(56) References Cited

U.S. PATENT DOCUMENTS

| | | | |
|---|---|---|---|
| 8,676,431 | B1* | 3/2014 | Mariet ............ B60T 7/22 701/28 |
| 8,718,861 | B1* | 5/2014 | Montemerlo ........ B60W 30/00 701/26 |
| 2012/0277947 | A1* | 11/2012 | Boehringer .......... B60W 30/17 701/23 |
| 2013/0131905 | A1 | 5/2013 | Green et al. |
| 2015/0015386 | A1 | 1/2015 | Langenhan |

FOREIGN PATENT DOCUMENTS

| | | |
|---|---|---|
| JP | 2008181327 A | 8/2008 |
| JP | 2013507673 A | 3/2013 |
| WO | 2011042160 A2 | 4/2011 |
| WO | 2013113709 A1 | 8/2013 |

\* cited by examiner

SYSTEM CONFIDENCE
COEFFICIENT Sa

SENSOR DETECTION RATE

SYSTEM CONFIDENCE
COEFFICIENT Sb

CPU LOAD

SYSTEM CONFIDENCE
COEFFICIENT Sc

FIDELITY OF PATH
TO COMPUTED RESULT
OF TARGET VALUE

INFORMATION PRESENTING APPARATUS AND INFORMATION PRESENTING METHOD

TECHNICAL FIELD

The present invention relates to an information presenting apparatus and an information presenting method.

BACKGROUND

An apparatus and method for preventing a driver from falling asleep by changing alarm sounding timing according to the state of the driver is conventionally known (see Japanese Patent Application Publication No. 2008-181327). When the eyes of a driver are closed for a period equal to or longer than a first threshold, Japanese Patent Application Publication No. 2008-181327 sounds the alarm for detection of a collision danger earlier than in a normal mode.

Japanese Patent Application Publication No. 2008-181327 is a technique pertaining to prevention of a driver's falling asleep, and is not configured to sound the alarm according to an action other than driving that the driver may perform during autonomous driving control in which a vehicle is driven autonomously.

SUMMARY

The present invention has been made in consideration of the above problem, and aims to provide an information presenting apparatus and an information presenting method which can raise a driver's feeling of reassurance and reliability with the autonomous driving control.

An information presenting apparatus according to an aspect of the present invention comprises a system confidence level calculator configured to calculate a system confidence level of autonomous driving control, an information presenter configured to present, to a driver, information on allowableness of an action other than driving, and an information presentation controller configured to control switching of a content of the information presented on the information presenter, according to the system confidence level calculated by the system confidence level calculator.

DETAILED DESCRIPTION OF THE EMBODIMENTS

Embodiments of the present invention are described hereinbelow with reference to the drawings. The same components are denoted by the same reference signs to avoid repetitive description.

First Embodiment

Configuration of the Information Presenting Apparatus

Figure 1:
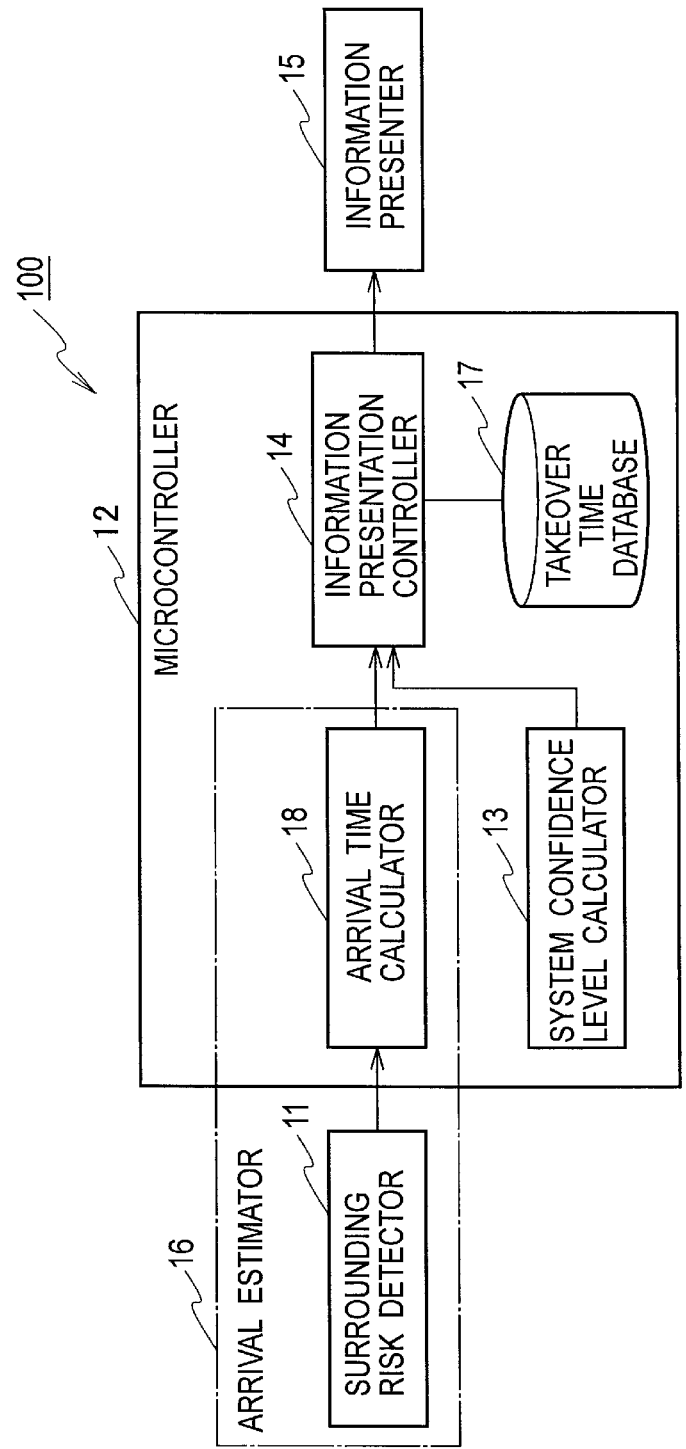
FIG. 1 is a block diagram showing the configuration of an information presenting apparatus 100 according to an embodiment.

With reference to FIG. 1, the configuration of an information presenting apparatus 100 according to a first embodiment is described. The information presenting apparatus 100 is applicable to an autonomous vehicle capable of switching between autonomous driving control, in which a vehicle is driven autonomously, and manual driving control, in which the vehicle is driven by a driver, the switching being made based on travelling conditions of the vehicle and outside circumstances of the vehicle. The information presenting apparatus 100 presents, to the driver, information on allowableness of an action other than driving during the autonomous driving control.

The information presenting apparatus 100 of the first embodiment presents, to the driver, information indicating an action that the driver is allowed to perform other than driving during the autonomous driving control. Multiple types are predefined for the actions other than driving. The information presenting apparatus 100 displays only a type that the driver is allowed to perform, which is determined according to a control system used for the autonomous driving control and surrounding environments of the vehicle.

For example, when switch from the autonomous driving control to the manual driving control is unnecessary, the information presenting apparatus 100 presents all the types to the driver as the actions that the driver is allowed to perform other than driving. When switch from the autonomous driving control to the manual driving control is necessary, on the other hand, the information presenting apparatus 100 displays only a type that the driver is allowed to perform, which is determined according to the urgency of the need for the switch.

Specifically, the information presenting apparatus 100 shown in FIG. 1 includes a surrounding risk detector 11, a microcontroller 12, and an information presenter 15.

The surrounding risk detector 11 detects a surrounding risk, which is a factor existing in the surroundings of the vehicle to hinder the autonomous driving control. Specifically, the surrounding risk detector 11 detects a map position at which it is predicted that the autonomous driving control may be prevented from proceeding, or an obstacle which serves as a cause for preventing the autonomous driving control from proceeding. For example, using a camera mounted in the vehicle, sensor information from a laser radar or an infrared sensor, or GPS information, the surrounding risk detector 11 detects a surrounding risk which is another vehicle parked on a current lane of travel of the vehicle, a crowded section, or a pedestrian entering or likely to enter the current lane of travel of the vehicle.

Figure 6:
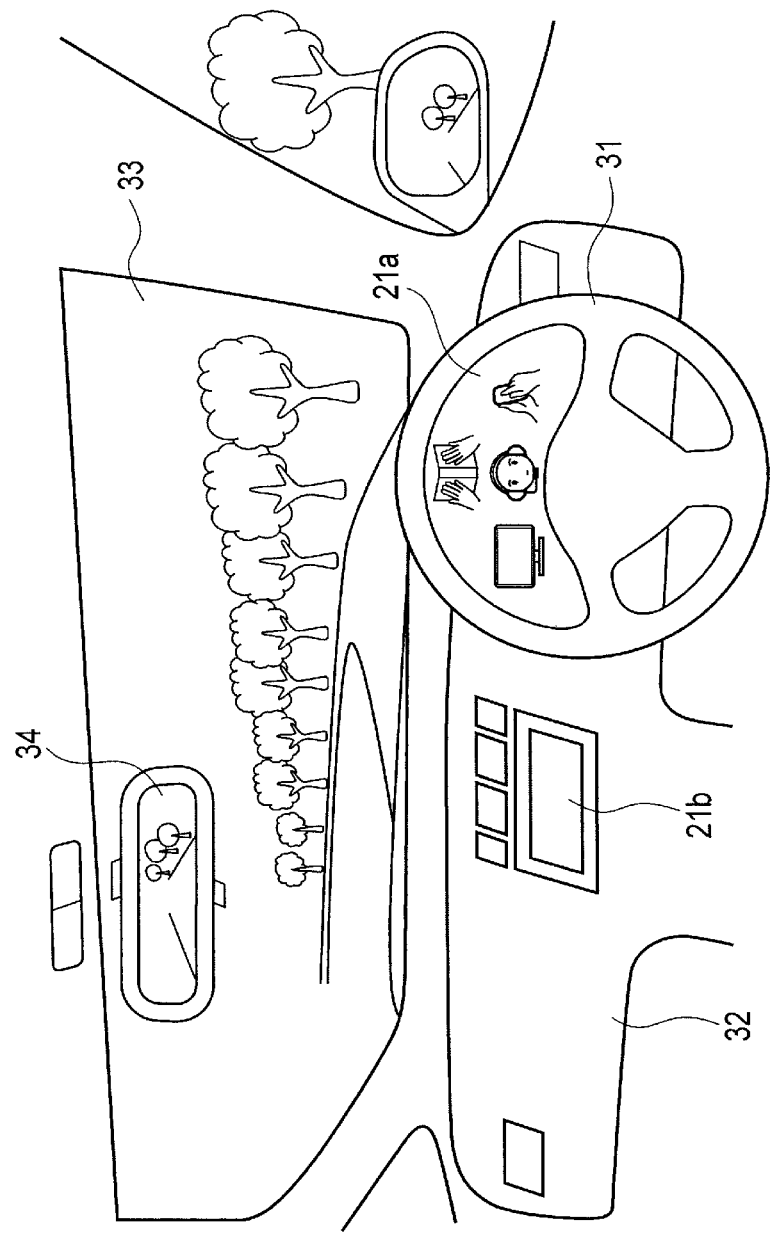
FIG. 6 is an external view showing an example of an information presenter 15 installed in a vehicle compartment.

The information presenter 15 presents information on allowableness of an action other than driving to the driver. Specifically, as shown in FIG. 6, the information presenter 15 is a display (21a, 21b) provided in a dashboard 32 and configured to display an icon image or icon images shown in FIG. 3 to be described later, as information on allowableness of an action other than driving. Needless to say, the information presenter 15 may display the information indicating an action other than driving on part of a front windshield 33 or a rearview mirror 34.

The microcontroller 12 includes a CPU, a memory, and an input and output unit. The CPU executes preinstalled computer programs to implement multiple information processors in the information presenting apparatus 100. The information processors implemented by the microcontroller 12 include an arrival time calculator 18, a system confidence level calculator 13, and an information presentation controller 14. Part of the memory in the microcontroller 12 constitutes a takeover time database 17 (a data storage). The microcontroller 12 may be used also as an ECU used for other vehicle control (e.g., the autonomous driving control).

The arrival time calculator 18 calculates an arrival time TR which is a period of time required for the vehicle to arrive at a surrounding risk detected by the surrounding risk detector 11. The arrival time TR is time expected to be required for the vehicle at its current position to arrive at a surrounding risk. Thus, the arrival time calculator 18 receives input of information on a surrounding risk and information on the current position of the vehicle, and computes the arrival time TR based on these pieces of information. The information on a surrounding risk is inputted by the surrounding risk detector 11, and the information on the current position of the vehicle is inputted by a navigation system installed in the vehicle. The surrounding risk detector 11 and the arrival time calculator 18 constitute an arrival estimator 16 configured to estimate the arrival time required for the vehicle to arrive at a surrounding risk.

For example, the arrival time calculator 18 computes the arrival time TR using Formula (1). In Formula (1), OBD represents the distance from the vehicle to an obstacle (such as another vehicle or a pedestrian), LDD represents the distance to a point where the vehicle deviates from a roadway, VLD represents the distance to a terminal point of an expressway, VL represents the speed of the vehicle, and TTC represents a time to collision with a preceding vehicle. L1, L2, and L3 are coefficients that vary depending on the travelling conditions of the vehicle (the speed of the vehicle and the coefficient of road surface friction) and the type of the vehicle. The terminal point of an expressway is, when driving control is to be switched to the manual driving mode at a tollbooth of a highway, the position of the tollbooth or a position short of the tollbooth by a predetermined distance. In addition, "Min" indicates the smallest one of the values inside the following parentheses.

[Expression 1]

$$TR = \text{Min}\left\{\frac{\text{Min}(L1 \times OBD, L2 \times LDD, L3 \times VLD)}{VL}, TTC\right\} \quad (1)$$

The system confidence level calculator 13 calculates a system confidence level based on at least one of sensor detection rate, CPU load, and fidelity of a path to a computed result of a target value. The system confidence level indicates the status of the control system used for the autonomous driving control.

Figure 2A:
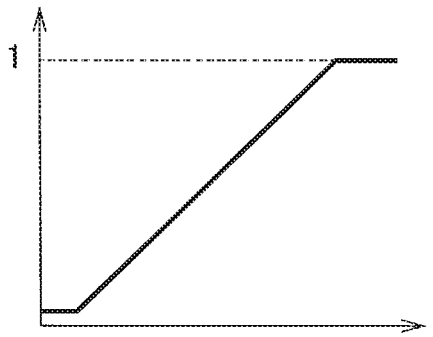
FIG. 2(a) is a graph showing an example of the relation between sensor detection rate and a system confidence coefficient Sa.
Figure 2B:
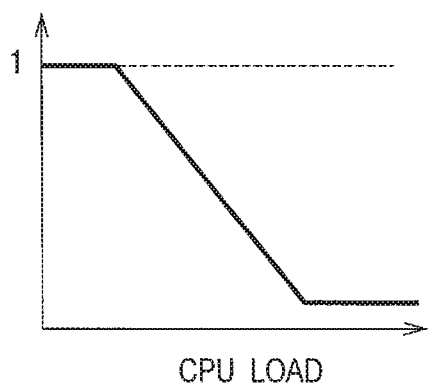
FIG. 2(b) is a graph showing an example of the relation between CPU load and a system confidence coefficient Sb.
Figure 2C:
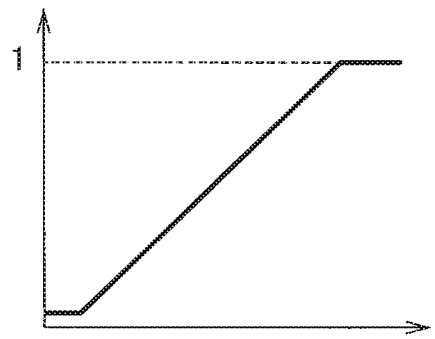
FIG. 2(c) is a graph showing an example of the relation between the fidelity of a path to a computed result of a target value and a system confidence coefficient Sc.

The sensor detection rate is a ratio of the current capability of a sensor to the maximum capability of the sensor. The sensor is a sensor used for the autonomous driving control to measure targets inside and outside the vehicle. For example, for a sensor capable of detecting an obstacle up to 200 meters ahead of the vehicle, the sensor detection rate is 0.5 if the laser sensor can detect only an obstacle 100 meters ahead. The system confidence level calculator 13 calculates a system confidence coefficient Sa based on the sensor detection rate by referring to data shown in FIG. 2(*a*).

The CPU load is a ratio of the current arithmetic processing capability of a CPU to the maximum arithmetic processing capability of the CPU. The CPU is a central processing unit used for the autonomous driving control. The system confidence level calculator 13 calculates a system confidence coefficient Sb based on the CPU load by referring to data shown in FIG. 2(*b*).

The fidelity of a path to a computed result of a target value indicates how well a travel path taken by the vehicle under the autonomous driving control coincides with a road (target value) indicated by the navigation system. For example, the fidelity is low when a travel path deviates greatly from a target value due to darkness of nighttime or bad weather (such as rain or strong wind). The fidelity is high when a travel path does not deviate so much from a target value in daytime. The system confidence level calculator 13 calculates a system confidence coefficient Sc based on the fidelity of a path to a computed result of a target value by referring to data shown in FIG. 2(*c*).

Each of the system confidence coefficients (Sa, Sb, Sc) is variable from a predetermined positive number (lower-limit value) to 1. The data shown in FIGS. 2(*a*) to 2(*c*) are stored in a memory accessible to the system confidence level calculator 13. The system confidence coefficients (Sa, Sc) increase as the sensor detection rate and the fidelity of a path to a computed result of a target value increase, respectively, and the system confidence coefficient (Sb) decreases as the CPU load increases.

The system confidence level calculator 13 calculates a system confidence level (S) by multiplying the system confidence coefficients (Sa, Sb, Sc) as shown in Formula (2).

$$S = Sa \times Sb \times Sc \times 100(\%) \quad (2)$$

The takeover time database 17 stores, for each action other than driving, takeover time TT required for the driver performing the action other than driving to be ready to take over and drive the vehicle. Specifically, the takeover time database 17 stores the takeover time TT for each of multiple predefined types (A1 to A5).

The takeover time TT is time required between when a driver notices that they should stop an action other than driving and when the driver stops the action other than driving and becomes ready to drive the vehicle by themselves. For example, it takes about one second or so for a driver whose hands are off the steering wheel to grip the steering wheel. It takes about one second or so for a driver whose eyes are fixed on a portable device or the like to turn their eyes to the front of the vehicle. The takeover time database 17 stores the takeover time for each action other than driving from a physical point of view.

Figure 3:
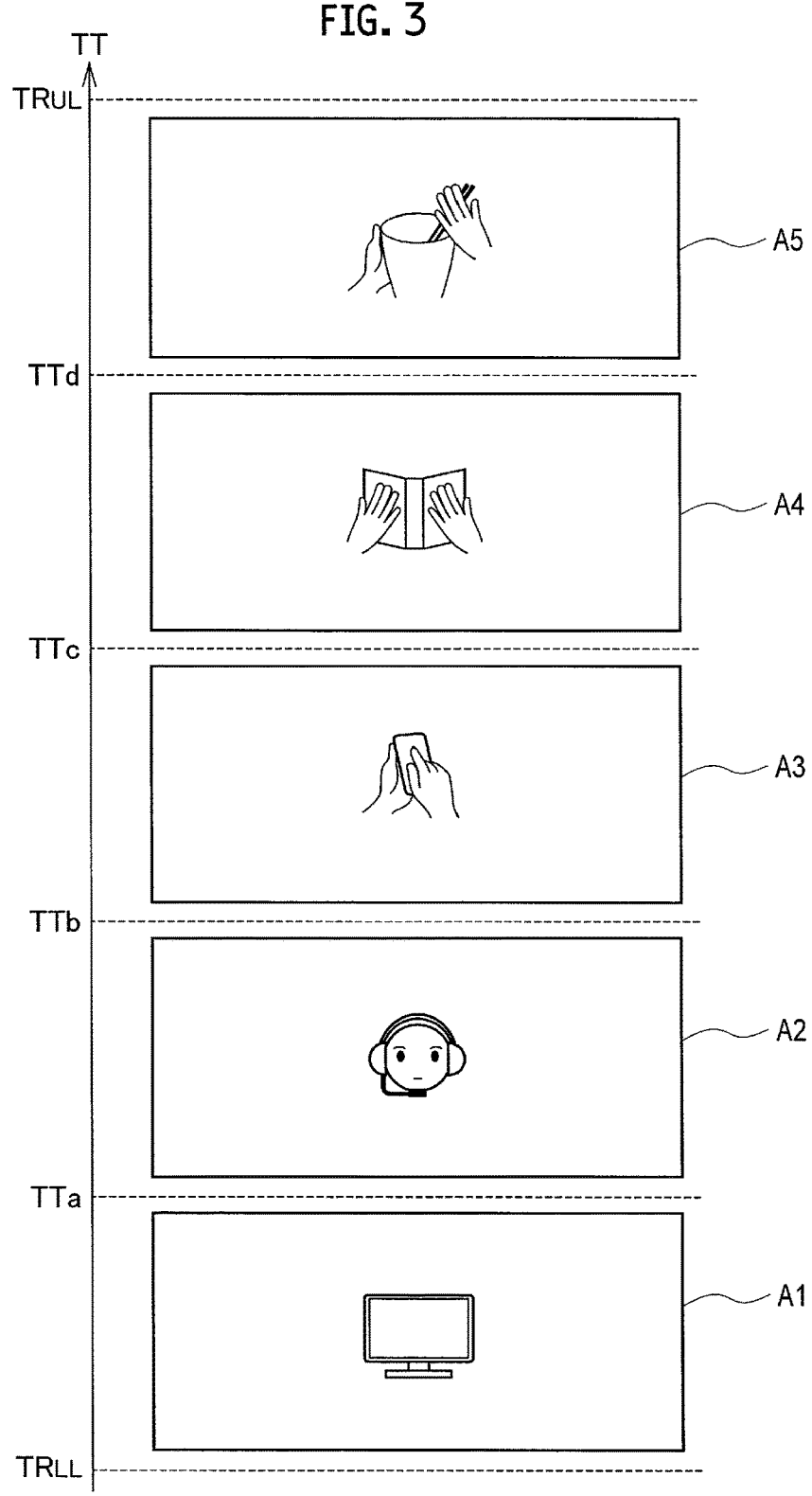
FIG. 3 shows an example of takeover time TT for each action other than driving, which is stored in a takeover time database 17 in FIG. 1, and shows actions that a driver is allowed to perform other than driving.

The type A1 in FIG. 3 includes an action that uses sight and hearing but not the other senses: a hand (touch), smell, and taste. An example of such an action is watching television installed in the vehicle compartment. The type A1 has the shortest takeover time among all the types (A1 to A5) because an action of the type A1 does not involve a hand or speaking. The type A2 includes an action of conversing with another person using a hands-free headset, such as taking on the phone, and an action of using a head-up display such as a wearable device. The type A2 has the shortest takeover time (TTa) next to the type A1 because an action of the type A2 does not involve a hand (touch) but involves speaking. The type A3 includes an action of operating a communication device using sight and a hand (touch), e.g., Internet browsing, texting, and gaming. The type A3 has the shortest takeover time (TTb) next to the type A2 because an action of the type A3 involves a hand.

The type A4 includes an action of reading a book held in the hand. The type A4 has the shortest takeover time (TTc) next to the type A3 because reading a book requires a higher concentration than actions of the other types (A1 to A3, A5). The type A5 includes an action involving a hand (touch), taste, and smell, i.e., eating. The type A5 has the longest takeover time (TTd) among all the types (A1 to A5) because the driver has to put the food and plate stably inside the vehicle to transition from eating to driving. Note that the takeover time for the type A1 is equal to the lower limit ($TR_{LL}$) of the arrival time. The upper limit of the arrival time TR is set to be even longer than the takeover time (TTd). The relations between the types (A1 to A5) and the takeover time TT described hereinabove are merely examples. The types may be set based on criteria other than the human senses, or the types (A1 to A5) in FIG. 3 may be used as they are but arranged in a different order of the takeover time TT.

The information presentation controller 14 controls switching of the content of the information presented on the information presenter 15 according to the arrival time TR estimated by the arrival estimator 16 and the system confidence level S calculated by the system confidence level calculator 13.

Specifically, when the system confidence level S is equal to or smaller than a predetermined threshold (Slimit), a transition is likely to be made from the autonomous driving control to the manual driving control. Thus, to notify the driver of the probable transition to manual driving, the information presentation controller 14 presents, to the driver, information indicating that there is no action that the driver is allowed to perform other than driving. On the other hand, when the system confidence level S is larger than the predetermined threshold (Slimit), a transition is not likely to be made from the autonomous driving control to the manual driving control. Thus, the information presentation controller 14 selects an action (or actions) that the driver is allowed to perform other than driving according to the arrival time TR, and presents the action to the driver. For example, the information presentation controller 14 determines an action that the driver is allowed to perform other than driving by comparing the arrival time TR calculated by the arrival time calculator 18 with the takeover time TT stored in the takeover time database 17.

Figure 4:
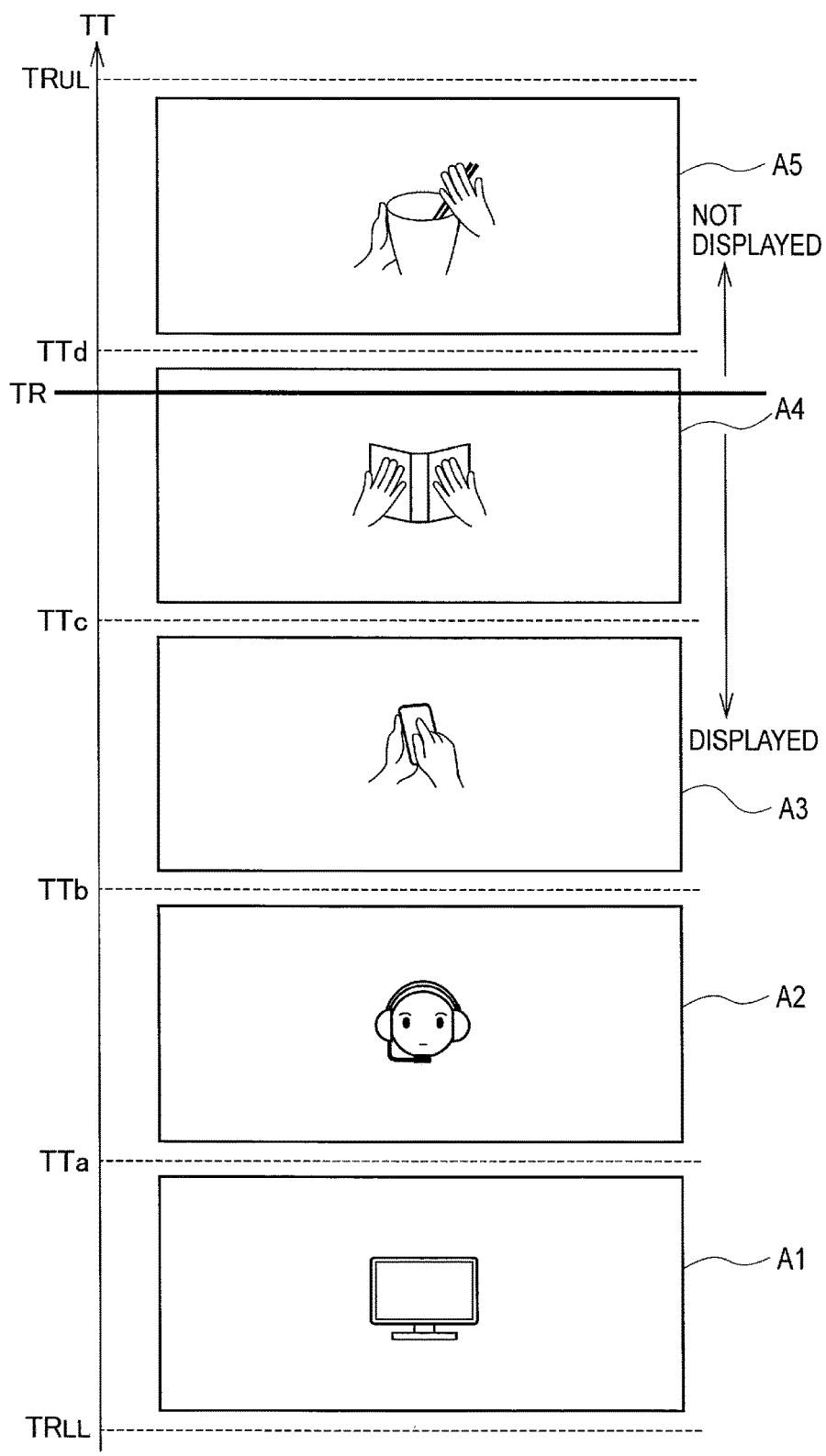
FIG. 4 is a diagram illustrating operation of an information presentation controller 14 that selects, according to an arrival time TR, a type of an action that the driver is allowed to perform other than driving, and presents the type to the driver.
Figure 5A:
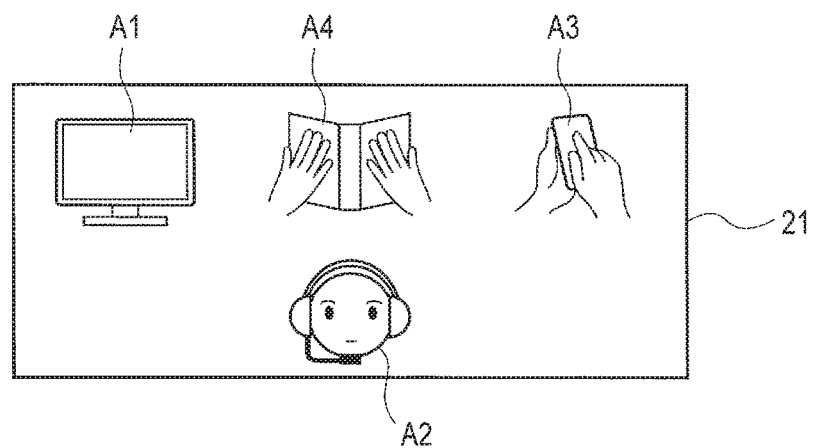
FIG. 5(a) is a diagram showing a display example of an action that the driver is allowed to perform other than driving, the action being selected according to the arrival time TR shown in FIG. 4.

As the information indicating an action that the driver is allowed to perform other than driving, the information presentation controller 14 presents, on the information presenter 15, information indicating an action other than driving the takeover time TT for which is equal to or shorter than the arrival time TR. For example, when the arrival time TR is anywhere between the takeover time TTc and the takeover time TTd as shown in FIG. 4, an action other than driving the takeover time TT for which is equal to or smaller than the arrival time TR is the actions belonging to the types A1 to A4. Thus, as the information indicating an action that the driver is allowed to perform other than driving, the information presentation controller 14 presents, on the information presenter 15, icon images for the types A1 to A4 shown in FIG. 4. For example, as shown in FIG. 5(*a*), multiple icon images may be displayed together on the display (21*a*, 21*b*), the front windshield 33, or the rearview mirror 34 in FIG. 6. By looking at the icon images indicating actions that the driver is allowed to perform, the driver can understand the condition of the system used for the autonomous driving control.

Operation of the Information Presenting Apparatus 100

Figure 7:
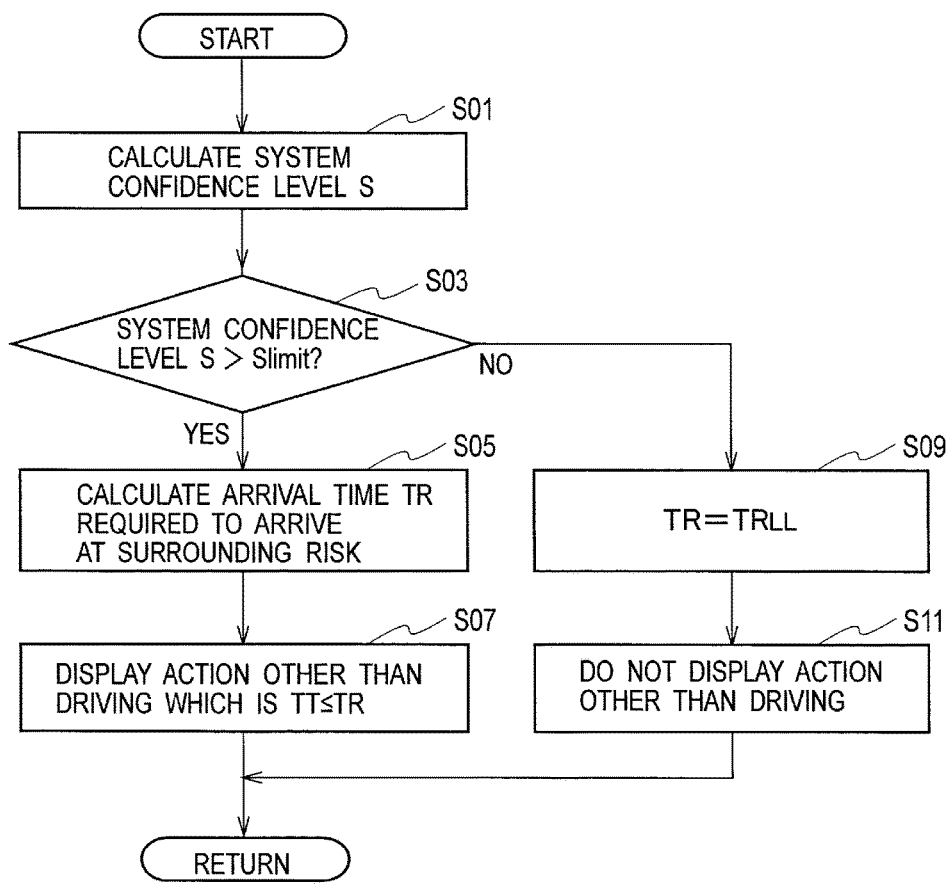
FIG. 7 is a flowchart showing an example of an information presenting method using the information presenting apparatus 100 in FIG. 1.

Next, with reference to FIG. 7, an example of an information presenting method using the information presenting apparatus 100 in FIG. 1 is described. The flowchart in FIG. 7 is repeated with a period predetermined by the microcontroller.

In Step S01, the system confidence level calculator 13 calculates the system confidence level S based on the sensor detection rate, the CPU load, and the fidelity of a path to a computed result of a target value, using Formula (2). In Step S03, the information presentation controller 14 determines whether the system confidence level S is larger than the predetermined threshold (Slimit).

When the system confidence level S is larger than the predetermined threshold (Slimit) (YES in S03), indicating that the system has no matter of urgency in its condition, it is determined that a transition is not likely to be made from the autonomous driving control to the manual driving control. Then, in Step S05, the arrival time calculator 18 calculates the arrival time TR required for the vehicle to arrive at a surrounding risk detected by the surrounding risk detector 11. Then, in Step S07, the information presentation controller 14 displays, on the information presenter 15, an icon image indicating an action of the type (A1 to A5) the takeover time TT for which is equal to or shorter than the arrival time TR. When the surrounding risk detector 11 detects no surrounding risk, the information presentation controller 14 determines that there is no surrounding risk, and sets the arrival time to its upper limit ($TR_{UL}$). As a result, the information presenter 15 displays icon images for all the types (A1 to A5).

Meanwhile, when the system confidence level S is equal to or smaller than the predetermined threshold (Slimit) (NO in S03), indicating that the system has a matter of urgency in its condition, it is determined that a transition is likely to be made from the autonomous driving control to the manual driving control. Then, in Step S09, the information presentation controller 14 sets the arrival time TR to its lower limit ($TR_{LL}$). Since no type (A1 to A5) has the takeover time TT that is equal to or shorter than the arrival time ($TR_{LL}$), the information presenter 15 does not display any icon image indicating an action that the driver is allowed to perform other than driving (S11). Thereby, the driver can be informed that there is no action that the driver is allowed to perform other than driving.

The first embodiment described above can achieve the following advantageous effects.

The information presentation controller 14 controls switching of the content of the information presented on the information presenter 15 according to the system confidence level S calculated by the system confidence level calculator 13. The presentation of an action that the driver may perform other than driving enables the driver to understand the condition of the system used for the autonomous driving control. This decreases the burden on the driver to monitor autonomous driving, and raises the driver's feeling of reassurance and reliability with the autonomous driving control.

As the information on allowableness of an action other than driving, the information presentation controller 14 presents, on the information presenter 15, information indicating an action that the driver is allowed to perform other than driving. The presentation of the action that the driver is allowed to perform other than driving enables the driver to understand the condition of the system used for the autonomous driving control.

The system confidence level calculator 13 calculates the system confidence level S based on at least one of the detection rate of the sensor used for the autonomous driving control, the load rate of the central processing unit used for the autonomous driving control, and the fidelity of a path to a computed result of a target value. Thereby, the condition of the control system used for the autonomous driving control can be accurately determined.

The information presentation controller 14 determines information to present to the driver by comparing the arrival time TR estimated by the arrival estimator 16 with the takeover time TT stored in the takeover time database 17. The driver performing the presented action other than driving can take over and drive the vehicle before a transition is made from the autonomous driving control to the manual driving control. Thus, the driver's feeling of reassurance and reliability with the autonomous driving control is raised.

As the information indicating an action that the driver is allowed to perform other than driving, the information presentation controller 14 presents, on the information presenter 15, information indicating an action other than driving the takeover time TT for which is equal to or shorter than the arrival time TR. The driver performing the action other than driving the takeover time TT for which is equal to or shorter than the arrival time TR can take over and drive the vehicle before a transition is made from the autonomous driving control to the manual driving control.

Second Embodiment

Instead of presenting an action that the driver is allowed to perform other than driving, the information presenting apparatus 100 in FIG. 1 may present an action that the driver is not allowed to perform other than driving, based on the arrival time TR and the system confidence level S.

In a second embodiment, the information presentation controller 14 presents, on the information presenter 15, information indicating an action that the driver is not allowed to perform other than driving, as the information on allowableness of an action other than driving. Specifically, as the information indicating an action that the driver is not allowed to perform other than driving, the information presentation controller 14 presents, on the information presenter 15, information indicating an action other than driving the takeover time TT for which is longer than the arrival time TR.

Figure 8:
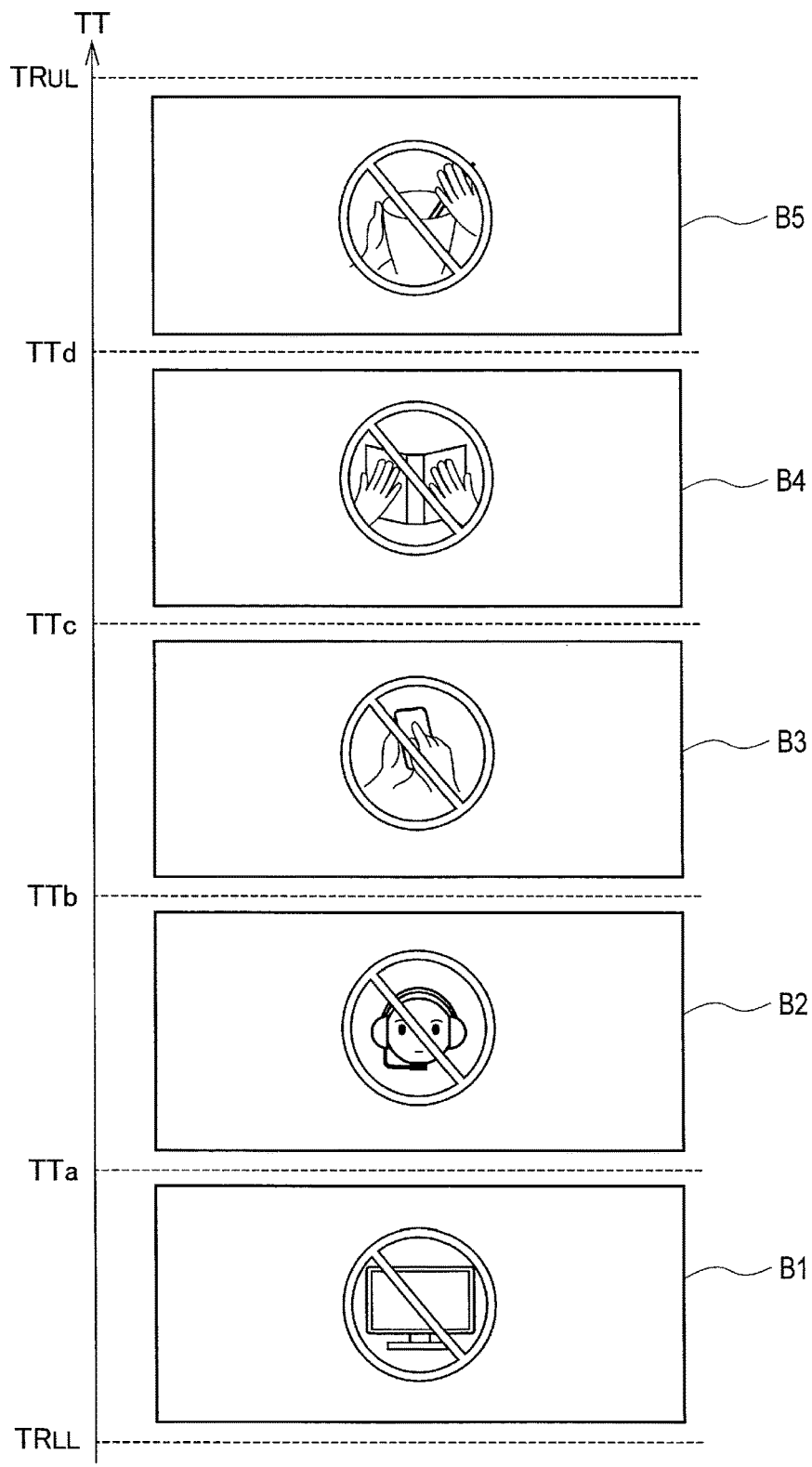
FIG. 8 shows an example of the takeover time TT for each action other than driving in a second embodiment, and shows actions that the driver is not allowed to perform other than driving.

As shown in FIG. 8, an icon image displayed on the information presenter 15 is a prohibition symbol superimposed on the icon shown in FIG. 3. More specifically, an icon indicating an action that the driver is not allowed to perform other than driving is formed by superimposition of a prohibition symbol on an icon indicating an action other than driving. However, the takeover time TT for each of the actions other than driving stored in the takeover time database 17 may be the same as that shown in FIG. 3. Actions other than driving that belong to types (B1 to B5) may be the same as those belonging to the types (A1 to A5) in FIG. 3.

When the system confidence level S is equal to or smaller than the predetermined threshold (Slimit), a transition is likely to be made from the autonomous driving control to the manual driving control. Thus, to notify the driver of the probable transition to manual driving, the information presentation controller 14 presents, to the driver, information indicating that the driver is not allowed to perform actions other than driving that belong to all the types (B1 to B5). When the system confidence level S is larger than the predetermined threshold (Slimit), on the other hand, a transition is not likely to be made from the autonomous driving control to the manual driving control. Thus, the information presentation controller 14 selects an action that the driver is not allowed to perform other than driving according to the arrival time TR, and presents the action to the driver. For example, the information presentation controller 14 determines an action that the driver is not allowed to perform other than driving by comparing the arrival time TR calculated by the arrival time calculator 18 with the takeover time TT stored in the takeover time database 17.

Figure 5B:
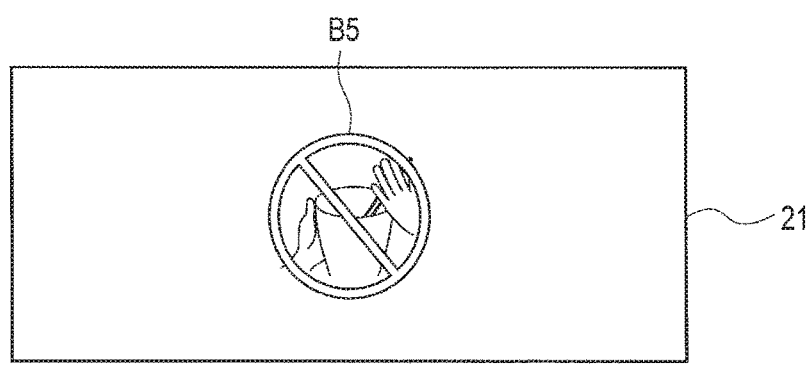
FIG. 5(b) is a diagram showing a display example of an action that the driver is not allowed to perform other than driving, the action being selected according to the arrival time TR shown in FIG. 9.
Figure 9:
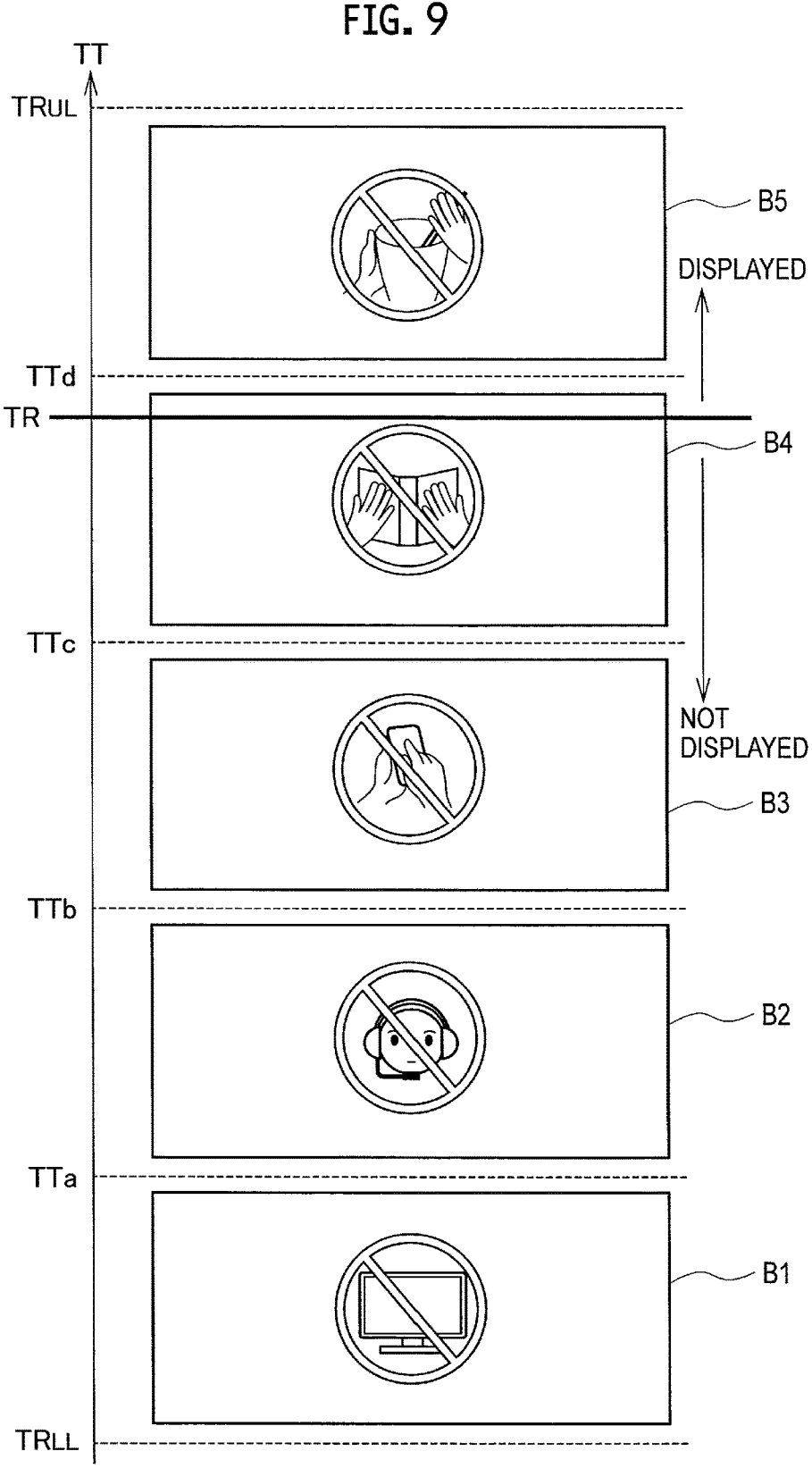
FIG. 9 is a diagram illustrating operation of the information presentation controller 14 that selects, according to the arrival time TR, a type of an action that the driver is not allowed to perform other than driving, and presents the type to the driver.

As the information indicating an action that the driver is not allowed to perform other than driving, the information presentation controller 14 presents, on the information presenter 15, information indicating an action other than driving the takeover time TT for which is longer than the arrival time TR. For example, when the arrival time TR is anywhere between the takeover time TTc and the takeover time TTd as shown in FIG. 9, an action other than driving the takeover time TT for which is longer than the arrival time TR is the action belonging to the type B5. Thus, as the information indicating an action that the driver is not allowed to perform other than driving, the information presentation controller 14 presents, on the information presenter 15, an icon image for the type B5 shown in FIG. 9. For example, as shown in FIG. 5(b), the icon image for the type B5 may be displayed on the display (21a, 21b), the front windshield 33, or the rearview mirror 34 in FIG. 6. By looking at the icon image indicating an action that the driver is not allowed to perform, the driver can easily understand the condition of the system used for the autonomous driving control.

Figure 10:
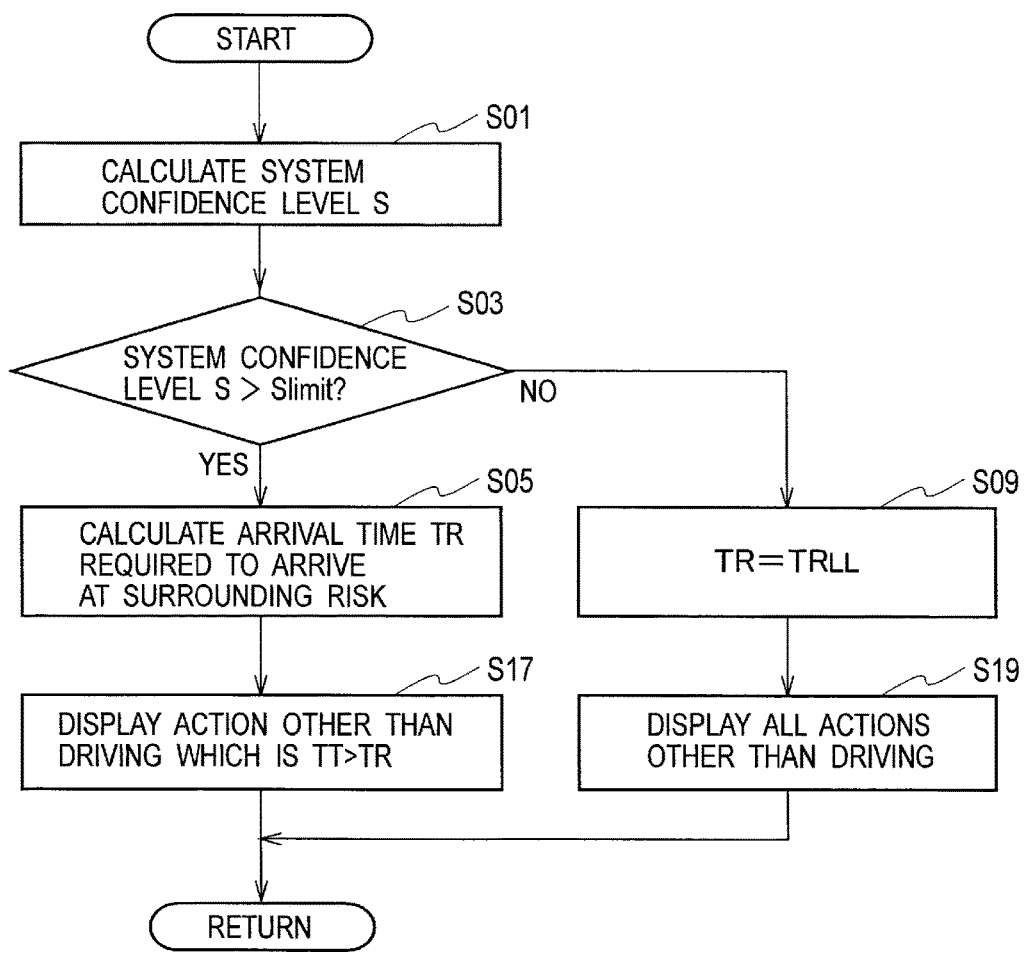
FIG. 10 is a flowchart showing an example of an information presenting method according to the second embodiment.

With reference to FIG. 10, operation of the information presenting apparatus 100 according to the second embodiment is described. When the system confidence level S is larger than the predetermined threshold (Slimit) (YES in S03), in Step S07 the information presentation controller 14 displays, on the information presenter 15, an icon image for the type (B1 to B5) the takeover time TT for which is longer than the arrival time TR. When the surrounding risk detector 11 detects no surrounding risk, the information presentation controller 14 determines that there is no surrounding risk, and sets the arrival time to its upper limit ($TR_{UL}$). As a result, the information presenter 15 does not display any icon image indicating an action that the driver is not allowed to perform other than driving.

Meanwhile, when the system confidence level S is equal to or smaller than the predetermined threshold (Slimit) (NO in S03), in Step S09 the information presentation controller 14 sets the arrival time TR to its lower limit ($TR_{LL}$). As a result, the information presenter 15 displays icon images for all the types (B1 to B5). Thereby, the driver can be informed that none of the actions other than driving is allowed (S19).

Other configurations and operations of the information presenting apparatus 100 are the same as those of the first embodiment, and are therefore not described.

As the information on allowableness of an action other than driving, the information presentation controller 14 presents, on the information presenter 15, information indicating an action that the driver is not allowed to perform other than driving. The presentation of the action that the driver is not allowed to perform other than driving enables the driver to understand the condition of the system used for the autonomous driving control.

As the information indicating an action that the driver is not allowed to perform other than driving, the information presentation controller 14 presents, on the information presenter 15, information indicating an action other than driving the takeover time TT for which is longer than the arrival time TR. If an action other than driving that the driver is performing is not presented on the information presenter 15, the driver can take over and drive the vehicle before switch is made from the autonomous driving control to the manual driving control.

Although the present invention has been described hereinabove using the embodiments, the present invention is not limited to what is described in those embodiments, and can be modified and improved variously, as is apparent to those skilled in the art.

For example, the information presentation controller 14 can present, on the information presenter 15, both of information indicating an action that the driver is allowed to perform other than driving and information indicating an action that the driver is not allowed to perform other than driving. In this case, the takeover time database 17 stores icon images indicating actions belonging to the types (A1 to A5) shown in FIG. 3. as well as icon images indicating actions belonging to the types (B1 to B5) shown in FIG. 8. The information presentation controller 14 may display, as an action that the driver is allowed to perform other than driving, an icon image indicating an action other than driving belonging to any of the types (A1 to A5) the takeover time TT for which is equal to or shorter than the arrival time TR, and display, as an action that the driver is not allowed to perform other than driving, an icon image indicating an action other than driving belonging to any of the types (B1 to B5) the take over time TT for which is longer than the arrival time TR.

The invention claimed is:

1. An information presenting apparatus for use in an autonomous vehicle capable of switching, based on a travelling condition of the vehicle and an outside circumstance of the vehicle, between autonomous driving control, in which the vehicle is driven autonomously, and manual driving control, in which the vehicle is driven by a driver, the information presenting apparatus comprising:
    an arrival estimating circuit configured to:
        detect a surrounding risk; and
        estimate an arrival time which is time required for the vehicle to arrive at the surrounding risk detected;
    a system confidence level calculator configured to calculate a system confidence level which indicates a status of a control system when executing the autonomous driving control;
    an information display configured to present, to the driver, information on allowableness of an action other than driving, wherein the information on allowableness of the action other than driving includes information indicating whether the driver is allowed to perform the action other than driving; and
    an information presentation controller configured to:
        on condition that the system confidence level exceeding a predetermined threshold, determine the information on allowableness of the action to present to the driver by comparing the arrival time and a takeover time, the takeover time being a time required for the driver performing the action other than driving to take over and drive the vehicle.

2. The information presenting apparatus according to claim 1, wherein
    as the information on allowableness of an action other than driving, the information presentation controller presents, on the information display, information indicating an action that the driver is allowed to perform other than driving.

3. The information presenting apparatus according to claim 1, wherein
    as the information on allowableness of an action other than driving, the information presentation controller presents, on the information display, information indicating an action that the driver is not allowed to perform other than driving.

4. The information presenting apparatus according to claim 1, wherein
    the system confidence level calculator calculates the system confidence level based on at least two of a detection rate of a sensor used for the autonomous driving control, a load rate of a central processing unit used for the autonomous driving control, and fidelity of a path to a computed result of a target value.

5. The information presenting apparatus according to claim 1, further comprising:
    a data storage configured to store the takeover time, the takeover time being stored for each action other than driving.

6. The information presenting apparatus according to claim 1, wherein
    the information on allowableness of an action other than driving includes information indicating an action that the driver is allowed to perform other than driving,
    as the information indicating an action that the driver is allowed to perform other than driving, the information presentation controller presents, on the information display, information indicating an action other than driving the takeover time for which is equal to or shorter than the arrival time.

7. The information presenting apparatus according to claim 1, wherein
    the information on allowableness of an action other than driving includes information indicating an action that the driver is not allowed to perform other than driving,
    as the information indicating an action that the driver is not allowed to perform other than driving, the information presentation controller presents, on the information display, information indicating an action other than driving the takeover time for which is longer than the arrival time.

8. The information presenting apparatus according to claim 1, wherein
the system confidence level calculator calculates the system confidence level based on a detection rate of a sensor used for the autonomous driving control, a load rate of a central processing unit used for the autonomous driving control, and fidelity of a path to a computed result of a target value.

9. The information presenting apparatus according to claim 1, wherein the arrival estimating circuit comprises:
a surrounding risk detector configured to detect the surrounding risk of a factor existing in surroundings of the vehicle and hindering the autonomous driving control.

10. The information presenting apparatus according to claim 9, wherein the surrounding risk detector comprises at least one of a camera, a laser radar, an infrared sensor, or GPS information.

11. An information presenting method applied to an autonomous vehicle capable of switching, based on a travelling condition of the vehicle and an outside circumstance of the vehicle, between autonomous driving control, in which the vehicle is driven autonomously, and manual driving control, in which the vehicle is driven by a driver, the information presenting method comprising:
detecting, using a surrounding risk detector, a surrounding risk of a factor existing in surroundings of the vehicle and hindering the autonomous driving control;
determining, using an arrival time calculator, an arrival time of a time required for the vehicle to arrive at the surrounding risk;
calculating a system confidence level which indicates a status of a control system when executing the autonomous driving control;
on condition that the system confidence level exceeding a predetermined threshold,
presenting, to the driver, information on allowableness of an action other than driving; and
switching the information on allowableness of the action to present to the driver by comparing the arrival time and a takeover time, the takeover time being a time required for the driver performing the action other than driving to take over and drive the vehicle.

12. An information presenting apparatus for use in an autonomous vehicle capable of switching, based on a travelling condition of the vehicle and an outside circumstance of the vehicle, between autonomous driving control, in which the vehicle is driven autonomously, and manual driving control, in which the vehicle is driven by a driver, the information presenting apparatus comprising:
a surrounding risk detector configured to detect a surrounding risk of a factor existing in surroundings of the vehicle and hindering the autonomous driving control;
an arrival time calculator configured to estimate an arrival time which is time required for the vehicle to arrive at the surrounding risk;
a system confidence level calculator configured to calculate a system confidence level which indicates a status of a control system when executing the autonomous driving control;
an information display configured to present, to the driver, information on allowableness of an action other than driving; and
an information presentation controller configured to:
on condition that the system confidence level exceeding a predetermined threshold, determine the information to present to the driver by comparing the arrival time and a takeover time, the takeover time being a time required for the driver performing the action other than driving to take over and drive the vehicle.

* * * * *